United States Patent [19]  [11]  3,996,333
Rooke et al.  [45]  Dec. 7, 1976

[54] METHOD FOR DEHYDRATING ORES

[75] Inventors: Philip M. Rooke; Harry B. Scott, both of Golden, Colo.; Peter A. Angevine, Ridgefield; Stanley A. Bunk, Greenwich, both of Conn.

[73] Assignees: Southwire Company, Carrollton, Ga.; National Steel Corporation, Pittsburgh, Pa.; Earth Sciences, Inc., Golden, Colo.

[22] Filed: Aug. 28, 1975

[21] Appl. No.: 608,557

[52] U.S. Cl. .................. 423/120; 75/1 R; 423/127; 423/625; 423/629; 432/15

[51] Int. Cl.$^2$ .......................... C01F 7/02

[58] Field of Search ......... 423/120, 629, 625, 127; 75/1; 34/57 A, 10; 432/14, 15

[56] References Cited

UNITED STATES PATENTS

| | | | |
|---|---|---|---|
| 1,137,617 | 4/1915 | Hershman | 423/137 |
| 2,498,710 | 2/1950 | Roetheli | 423/177 |
| 3,890,425 | 6/1975 | Stevens et al. | 423/127 |
| 3,890,426 | 6/1975 | Stevens et al. | 423/127 |

FOREIGN PATENTS OR APPLICATIONS 886,602   1/1962   United Kingdom .............. 423/170

Primary Examiner—M. J. Andrews
Attorney, Agent, or Firm—Kermith F. Ross; Van C. Wilks; Herbert M. Hanegan

[57] ABSTRACT

A method for dehydrating alunite ore prior to further processing to recover metals therefrom, comprising exposing the ore in particulate form to burning coal as the heat supply in a fluidized bed fluidized with an oxygen containing gas. The invention is illustrated by the removal of water from alunite ore prior to further processing the ore to recover aluminum.

7 Claims, No Drawings

METHOD FOR DEHYDRATING ORES

CROSS REFERENCE TO RELATED APPLICATIONS

The present invention is an improvement in the basic processes for recovering aluminum from alunite ore disclosed in U.S. Pat. No. 3,890,425 and 3,890,426 assigned to a common assignee with this application. The combined processes of these two patents are referred to hereinafter as the basic process.

BACKGROUND OF THE INVENTION

The invention lies in the field of beneficiating ores.

The present invention is an improvement in the process disclosed in the above-referenced patents for recovering aluminum from alunite ore, the prior process broadly comprising dehydrating the particulate ore by roasting, removing sulfur and alkali metals compounds from the roasted ore by one of the alternatives of a reducing roast followed by an oxidation roast and leaching with solvent as disclosed in U.S. Pat. No. 3,890,425 or by an alkaline leach as disclosed in U.S. Pat. No. 3,890,426, resulting in a residue containing aluminum values and a solution containing potassium sulfate which may optionally be recovered, digesting the residue with alkaline solution to convert the aluminum values to soluble aluminate, removing silica from the aluminate solution, and precipitating the aluminum values as aluminum hydroxide from which alumina is recovered. The expression "roasting and leaching to remove water and compounds of sulfur and alkali metals" as used herein includes the above alternatives.

This invention is an improvement of the above process in which the particulate alunite ore is dehydrated by exposing the ore to burning carbonaceous material in a fluidized bed fluidized by oxygen, air, or other oxygen containing gas. The invention is particularly applicable to dehydrating ores at relatively low temperatures.

In the recovery of metals from a number of minerals by various beneficiation procedures, the removal of combined and uncombined water from the mineral is frequently required as the first step before further processing. A good many minerals of this type contain water of hydration and surface water. Commercial processes for removing water from the minerals include roasting, combusting fuels such as, liquid hydrocarbons, in the presence of the minerals in a fluidized bed, and other methods.

Roasting the ores sometimes has the disadvantage that it drives off important by-products or causes chemical reactions which preclude the recovery of valuable by-products in further processing of the ores. In the case of the dehydration of alunite ore in particular, conventional roasting techniques in the absence of sufficient oxygen result in chemical reduction of the sulfate constituents of the alunite. This is particularly disadvantageous when reduction is to be performed following dehydration since the off gases from reduction contain potentially valuable components and any reduction simultaneous with dehydration would cause loss of these useful gases.

Dehydration by combusting fuels, such as, liquid and gaseous hydrocarbons at the high temperatures required, in the presence of the minerals in a fludized bed, is subject to the disadvantage that the fuels, before combustion, generally adhere to the surfaces of the mineral particles and then burn causing localized high temperatures above the desired processing temperature range with consequent damage. High combustion temperatures promote reduction of sulfates. High temperatures also result in the reaction of alumina formed by the reduction of sulfates with silica impurities present in the mineral to form silicates which are insoluble in alkaline solutions with reduced recovery of aluminum values.

Accordingly, it is an object of this invention to provide a method for dehydrating ores at relatively low temperatures prior to further processing to recover metals therefrom, which method does not result in the generation of localized high temperatures in the ores, or in the promotion of chemical reactions which might preclude the recovery of valuable products in the subsequent processing or result in reduced recovery of metals.

SUMMARY OF THE INVENTION

The present invention comprises the removal of water from minerals in particulate form prior to further processing by subjecting the mineral to the presence of burning coal in a fluidized bed fluidized by an oxygen containing gas.

The mineral to be dehydrated is crushed to an appropriate size and then processed in accordance with the present invention in a fluidized bed. The mineral is maintained in the fluidized state by a stream of oxygen containing gas, preferably air. Coal, pulverized to a sufficiently small size, is injected into the fluidized bed of crushed mineral either by mixing it with the stream of fluidizing air or by conveying it with air through a tube into the bed. The total amount of air supplied to the fluidized bed is preferably an amount which provides about 20–40% excess of oxygen required to completely burn the coal present in the bed. The temperature of the bed must be at or above the ignition point of coal but not high enough to promote detrimental side reactions between constituents of the ore. In the case of alunite, a temperature not in excess of about 625° C is preferred with a preferred temperature range being about 525°–625° C.

DESCRIPTION OF THE PREFERRED EMBODIMENT

The invention will be illustrated by its application to the basic processes for the recovery of alunite from its ore although it is by no means limited to this application.

In the processes of the reference patents, water is removed from alunite ore in the first step of the processes by roasting. In the process of U.S. Pat. No. 3,890,425, the next step in the processing of the ore is a reducing roast of the dehydrated ore followed by an oxidation roast prior to leaching with water or caustic to remove sulfur and alkali metal compounds from the roasted ore. In the process of U.s. Pat. No. 3,890,426, the dehydrated ore is leached directly with ammonium hydroxide or an alkali metal hydroxide.

As pointed out above, conventional roasting procedures frequently result in the reduction of sulfate constituents of the alunite so that they are lost and cannot be recovered in the subsequent reduction step and they also result in reduced recovery of alumina.

The minerals to which the process is applicable are chiefly those which cannot be subjected to high temperatures during dehydration. The process is peculiarly applicable to alunite ore because at the low temperatures at which the process is performed very little chemical reaction results in which valuable products are lost. Because the coal particles do not stick to the ore particles, no localized high temperature areas are produced. The type of coal used is preferably a low grade coal having a high volatile matter content so that its combustion does not produce high temperatures, and, specifically, temperatures above about 625° C for alunite. Other carbonaceous materials which burn at low temperatures may be used.

It is desirable to perform the dehydration at the lowest suitable temperature so that a minimum of detrimental chemical reactions will occur. The preferred temperature range stated above has generally been considered too low for the successful use of coal, but examples included below have demonstrated the practicality of this temperature range with the type coal used. It is a unique feature of the invention that the ore can be successfully dehydrated with coal at these moderate temperatures. Coal offers the advantage that the particles burn as discreet particles and do not stick to the mineral surfaces, thus avoiding the damage of excessive localized temperatures.

The use of coal in the system offers a potential economic advantage over other possible fuels, in that the direct combustion of the particles in the bed provides efficient utilization of the liberated heat. As stated above, a significant advantage of the present process when applied to alunite dehydration is that the oxidizing atmosphere produced in the fluidized bed prevents chemical reduction of the sulfate constituents of the alunite.

The preferred oxygen-containing gas is air because of its cheapness. However, pure oxygen, which is included in the term "oxygen-containing gas", could be used and other oxygen-containing gases are operative in the process. Conventional type fluidized beds can be used and there is not criticality in the bed structure. Preferably, for economic reasons, the process is performed continuously. The process could be performed in a rotary kiln.

For alunite is was found that air should be introduced into the bed at a rate to provide oxygen in an excess of at least about 20% of the amount required to completely burn the coal present in the bed and, preferably, about 20% excess. This insures oxidizing atmosphere in the bed. If substantially less than 20% excess is used too many side reactions result and if substantially more than 40% excess is used, oxygen is wasted. As stated above, the coal may be injected into the fluidized bed either by mixing it with the stream of fluidizing air or conveying it with air through a tube into the bed.

The residence time of the ore in the bed will, of course, depend upon the type of ore, the moisture content, and other factors. The preferred time can be determined by routine testing.

The following examples are illustrative of the invention but not limiting thereof.

The tests upon which the examples are based were conducted in a 12 inch diameter fluidized bed unit yielding a product of coarse material in the bottom (the underflow product) and fine material at the top (cyclone product). The alunite ore used was ground to less than 20 mesh (Tyler screen scale). Material much larger than this is generally difficult to fluidize. The as-mined alunite ore had a water content of 6.5 weight percent.

The coal used was a low grade Utah coal having a high volatile matter content (36% by proximate analysis) which burns below 625° C. The coal was introduced into the bed by mixing it in the stream of fluidizing air. It was gound to less than 48 Tyler mesh for ease in injection. The tests were conducted with an amount of air to provide about a 40 percent excess of oxygen above that necessary for combustion to assure the required oxidizing nature of the environment. Various process parameters, such as, temperatures, residence time, feed rate, and others are given in the examples.

EXAMPLES

| TEST NUMBER | 23 | 24 |
| --- | --- | --- |
| Average Bed Temperature, ° C | 580 | 580 |
| Average Holding Time, Min. | 38 | 65 |
| Feed Rate, Lb/Hr. | 480 | 480 |
| Underflow Product, Lb/Hr. | 210 | 225 |
| Cyclone Product, Lb/Hr. | 181 | 194 |
| Bed Depth, Ft. | 2.75 | 5 |
| Fluidizing Air, SCFM | 20.2 | 19.7 |
| Coal Injection Air, SCFM | 1.5 | 2.0 |
| Feed Air, SCFM | 5.0 | 5.0 |
| Purge Air, SCFM | 1.5 | 1.5 |
| Coal Feed Rate, Lb/Hr. | 7.93 | 7.93 |
| Actual Air Feed Rate/Theoretical Air Required | 1.3 | 1.3 |
| Lb Coal/Lb Underflow Product | .038 | .036 |

| FEED MATERIAL ANALYSIS | | |
| --- | --- | --- |
| UNDERFLOW FRACTION | | |
| Wt % Water of Hydration | 5.6 | 5.6 |
| Wt % Total Sulfur | 6.6 | 6.6 |
| CYCLONE PRODUCT FRACTION | | |
| Wt % Water of Hydration | 7.5 | 7.5 |
| Wt % Total Sulfur | 8.9 | 8.9 |
| PRODUCT ANALYSIS: | | |
| UNDERFLOW | | |
| Wt % Total Sulfur | 6.7 | 6.9 |
| Wt % Water of Hydration | 0.7 | 0.7 |
| CYCLONE PRODUCT | | |
| Wt % Total Sulfur | 9.0 | 9.1 |

It will be noted from the results that the moisture content of the ore was reduced in each test to less than one percent. The dehydrated product of test 24 yielded a 94% recovery of aluminum proving that the recoverability of aluminum in the ore was not impaired by the process.

It is an advantage of the invention that ore dehydration can be accomplished at moderate temperatures at which excessive chemical reaction is avoided. It is a further advantage of the invention that dehydration of alunite ore can be accomplished without the generation of localized high temperature areas in the ore with resultant reduction of sulfate and formation of aluminum silicate. As applied to alunite ore, this latter is a distinct advantage, particularly, when the dehydration is followed by a reduction step in that sulfates are not reduced in the oxidizing atmosphere produced in the fluidized bed so that valuable product gases can be recovered in the subsequent reduction step. The dehydration procedure does not cause reduced alumina recovery. This makes the process perculiarly applicable to the basic process referred to above for recovering aluminum from alunite ores in which dehydration is followed by a reduction step.

While the invention has been disclosed by its application to the dehydration of alunite ore, it is by no means limited to this type ore, as it can be used for the dehydration and drying of ores in general, and it is particularly applicable to situations wherein it is advantageous to conduct the dehydration at moderately low temperatures.

What is claimed is:

1. A continuous method for dehydrating alunite mineral which comprises:
   a. introducing the alunite mineral in particulate form into a fluidized bed fluidized by air;
   b. introducing particulate coal having a combustion temperature below about 625° C into the fluidized bed at a temperature maintained up to about 625° C to combust the coal;
   c. controlling the rate of introduction of air into the fluidized bed to provide about 20–40% excess oxygen for completely burning all the coal present in the bed, and
   d. maintaining the particulate alunite in the fluidized bed in the presence of the burning coal a sufficient time to substantially dehydrate the alunite.

2. The method of claim 1 in which the temperature is about 525°–625° C.

3. In the method for processing alunite ore containing combined or uncombined water to recover aluminum therefrom in which the water must be removed before further processing for effective recovery of the aluminum, the improvement which comprises:
   dehydrating the alunite ore by exposing said ore to the heat from burning particulate coal having a combustion temperature below about 625° C in a fluidized bed fluidized with an oxygen containing gas at a temperature not in excess of about 625° C a sufficient time to remove substantially all of the water from the alunite ore.

4. In the method of recovering aluminum values from particulate alunite ore in which the ore is roasted and leached to remove water and compounds of sulfur and alkali metals resulting in a residue containing aluminum values and a solution containing potassium sulfate which may optionally be recovered, the residue digested with at least one alkali metal hydroxide to convert aluminum values to soluble aluminate, silica removed from the aluminate solution, aluminum hydroxide precipitated from the soluble aluminate and aluminum values recovered from the aluminum hydroxide the improvement which comprises:
   removing water from the particulate alunite ore prior to the roasting step by maintaining the ore in a fluidized state with an oxygen containing gas in a fluidized bed at a temperature maintained up to about 625° C in the presence of burning coal having a combustion temperature below about 625° C.

5. A process for recovering aluminum values from alunite ore in which a minimum of valuable by-products and aluminum are lost as a result of the dehydration step, the process comprising:
   a. dehydrating the ore by exposing it in particulate form to burning coal having a combustion temperature below about 625° C at a temperature maintained up to about 625° C in a fluidized bed fluidized with an oxygen containing gas to maintain an oxidizing atmosphere in the bed;
   b. subjecting the dehydrated ore first to a reducing roast and then to an oxidizing roast;
   c. leaching the roasted ore with an alkali metal hydroxide or water to remove sulfur and alkali metal compounds and leave a residue containing aluminum values;
   d. digesting the residue with at least one alkali metal hydroxide to convert the aluminum values to soluble aluminate;
   e. removing silica from the soluble aluminate;
   f. precipitating aluminum hydroxide from the aluminate; and
   g. recovering aluminum values from the aluminum hydroxide.

6. A process for recovering aluminum values from alunite ore in which a minimum of by-products are lost as a result of the dehydration step, the process comprising:
   a. dehydrating the ore by heating it with coal having a combustion temperature below about 625° C at a temperature up to about 625° C in a fluidized bed fluidized with an oxygen containing gas;
   b. leaching the dehydrated ore with ammonium hydroxide to remove sulfur and alkali metal compounds and leave a residue containing aluminum values;
   c. digesting the residue with at least one alkali metal hydroxide to convert the aluminum values to soluble aluminate;
   d. removing silica from the soluble aluminate;
   e. precipitating aluminum hydroxide from the aluminate, and
   f. recovering aluminum values from the aluminum hydroxide.

7. A continuous method for dehydrating alunite mineral which comprises:
   a. introducing the alunite mineral in particulate form into a fluidized bed fluidized by an oxygen containing gas;
   b. introducing particulate coal having a combustion temperature below about 625° C into the fluidized bed at a temperature maintained up to about 625° C to combust the coal;
   c. controlling the rate of introduction of the oxygen containing gas into the fluidized bed to provide an oxidizing atmosphere therein, and
   d. maintaining the particulate alunite in the fluidized bed in the presence of the burning coal a sufficient time to substantially dehydrate the alunite.

* * * * *